(12) United States Patent
Yang et al.

(10) Patent No.: US 6,573,892 B1
(45) Date of Patent: Jun. 3, 2003

(54) METHOD OF CONSTRUCTING SURFACE ELEMENT LAYERS OF HEXAHEDRAL MESH FOR FINITE ELEMENT ANALYSIS AND METHOD OF CONSTRUCTING HEXAHEDRAL MESH USING THE SAME

(75) Inventors: Dong Yol Yang, Taejun (KR); Young Kyu Lee, Taejun (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 223 days.

(21) Appl. No.: 09/699,680

(22) Filed: Oct. 30, 2000

(30) Foreign Application Priority Data

Oct. 29, 1999 (KR) .............................................. 99-47549

(51) Int. Cl.$^7$ .............................................. G06T 17/00
(52) U.S. Cl. ...................................... 345/421; 345/423
(58) Field of Search ................................ 345/418, 419, 345/420, 421, 423, 424

(56) References Cited

U.S. PATENT DOCUMENTS 6,246,468 B1 * 6/2001 Dimsdale ................... 356/4.02

OTHER PUBLICATIONS

R. Kopp et al., "Application of FEM to Prediction of Microstructure in Hot Forming of Metal," Advanced Technology of Plasticity 1993, Proc. of 4th ICTP, vol. 2, pp. 1203–1211, (Sep. 5–9, 1993).

Reza Taghavi, "Automatic Mesh Generation from CAD on Vector–Parallel and Massively Parallel Supercomputers," Report of Cray Co., (1994).

A.E. Tekkaya et al., "3–D Simulation of Metal Forming Processes With Automatic Mesh Generation," Steel Research, vol. 66, pp. 377–383, (1995).

* cited by examiner

Primary Examiner—Cliff N. Vo
(74) Attorney, Agent, or Firm—Akin Gump Strauss Hauer & Feld, L.L.P.

(57) ABSTRACT

A method of constructing surface element layers for improving boundary shape of a hexahedral mesh used in finite element analysis comprises constructing a core mesh by superimposing a regular grid on a region to be meshed and removing external elements and external nodes of the region to be meshed; amending the core mesh to have a boundary shape similar to that of the region to be meshed by repositioning nodes on the boundary of the core mesh; constructing imaginary thin surface element layers on a boundary surface of the amended core mesh; and performing a mesh smoothing on the imaginary thin surface element layers.

9 Claims, 4 Drawing Sheets

$n$ ; OFFSET VECTOR AT FACE NODE $n_1^{(F)}, n_2^{(F)}, n_3^{(F)}, n_4^{(F)}$: NORMAL VECTORS OF FACES ADJACENT TO THE FACE NODE $n, n_1, n_2$ : OFFSET VECTORS AT EDGE NODE
$n_1^{(F)}, n_2^{(F)}, n_3^{(F)}, n_4^{(F)}$ : NORMAL VECTORS OF FACES ADJACENT TO THE EDGE NODE $n_1^{(F)}, n_2^{(F)}, n_3^{(F)}$ : NORMAL VECTORS OF FACES ADJACENT TO VERTEX NODE

METHOD OF CONSTRUCTING SURFACE ELEMENT LAYERS OF HEXAHEDRAL MESH FOR FINITE ELEMENT ANALYSIS AND METHOD OF CONSTRUCTING HEXAHEDRAL MESH USING THE SAME

TECHNICAL FIELD

The present invention relates to a method of constructing surface element layers for improving shape of hexahedral mesh used in finite element analysis and a method of constructing hexahedral mesh using the method of constructing surface element layers.

BACKGROUND OF THE INVENTION

The finite element analysis is widely used for predicting safety of various structures, analyzing engineering problems associated with differential equation such as distribution analysis of electromagnetic field and the like and metal forming processes such as extrusion and forging.

During the finite element analysis, locally concentrated large deformation occurs around corners of an object to be analyzed. Such locally concentrated large deformation makes determinant of transformation matrix of an element negative, so that the analysis can be impossible. When a mesh element is severely distorted and the negative determinant arises, a new mesh having well-shaped elements has to be constructed to replace the degenerated old mesh. Therefore, an automatic mesh-reconstructing method, hereinafter referred to as remeshing, is required for a smooth and rapid finite element analysis.

Of automatic 3-dimentional mesh construction methods, tetrahedral mesh construction methods such as Delauney algorithm and Octree techniques have been widely used because the methods enable very robust and near-optimal mesh to be constructed.

On the other hand, hexahedral mesh construction methods are preferred because the methods improve accuracy of the analysis. The hexahedral mesh construction methods mainly based on a mapping method have disadvantages that a complex-shaped 3-dimentional region to be meshed has to be semi-automatically divided into several simple sub-regions in which mesh can be constructed and that ineffective mesh can be constructed because local density of mesh cannot be controlled.

A grid-based approach of the conventional hexahedral mesh construction methods enables a hexahedral mesh to be automatically constructed without semi-automatic process such as manual dividing into sub-regions.

Technique of constructing a mesh using a grid-based approach is described in a paper entitled "Application of FEM to Prediction of Microstructure in Hot Forming of Metals", written by R. Kopp. K. Karhausen and R. Schneiders, and published in Proc. of $4^{th}$ ICTP, pp. 1203–1211 in 1993.

However, because many surface elements are severely distorted in the technique of constructing a mesh using the grid-based approach, this technique has a disadvantage that accurate prediction cannot be performed in analysis.

A technique of constructing a mesh by use of a grid-based approach, dividing ill-shaped elements into several sorts and repositioning corresponding elements according to fixed regulation is disclosed in a paper entitled "Automatic Mesh Generation from CAD on Vector-parallel and Massively Parallel Supercomputers", written by R. Taghavi, and published in Report of Cray Co. in 1994.

However, such technique has disadvantages that it is suitable only for large-scaled mesh and that the ill-shaped elements still remain.

A method of constructing mesh elements in space between a internal regular grid and a boundary surface of region to be meshed when constructing mesh using a grid-based approach is disclosed in a paper entitled "3-D Simulation of metal Forming Processes with Automatic Mesh Generation Automatic Mesh", written by A. E. Tekkaya and S. Kavakli, and published in Steel Research, Vol.66. pp.377–383 in 1995.

Such method has an advantage that relatively well-shaped elements can be constructed. However, such method has disadvantages that it is difficult to reflect geometrical characteristics of the region boundary and elements construction at the region boundary must be performed by only one method.

The grid-based mesh construction methods described above, unlike the conventional methods based on a mapping method, can automatically construct a mesh consisting of hexahedral mesh elements without dividing the whole region into sub-regions having several simple shapes. However, such methods have a disadvantage that excessive distortions of the surface elements can occur.

SUMMARY OF THE INVENTION

Therefore, the present invention is made in order to solve the conventional problems described above.

An object of the present invention is to provide a method of constructing surface element layers of a hexahedral mesh used in finite element analysis, capable of improving the shape of boundary elements of the hexahedral mesh and improving accuracy of prediction in analysis by constructing surface element layers and repositioning nodes of the surface elements.

Another object of the present invention is to provide a method of constructing a hexahedral mesh using the above method of constructing surface element layers for improving shape qualities of severely-distorted boundary surface elements.

The above objects can be accomplished by a method of constructing surface element layers of a hexahedral mesh used in finite element analysis, the method comprising: a step of constructing imaginary thin surface element layers on a boundary surface of a mesh; and a step of performing a mesh smoothing on said imaginary thin surface element layers.

The step of constructing said imaginary thin surface element layers is performed by obtaining offset vectors outward at each node on faces, edges and vertexes of said boundary surface of said mesh, positioning new nodes at positions offset in directions of said obtained offset vectors and then assigning connectivity of said new nodes for new elements.

Also, the step of performing a mesh smoothing is performed by repositioning node on vertex, node on edge and node on face of boundary surface of said imaginary thin surface element layers and internal node of said imaginary thin surface element layers, respectively.

It is preferable that the repositioning of nodes is performed in order of repositioning nodes on the edge, repositioning nodes on the face and repositioning the internal nodes, in a state that positions of nodes on the vertex are fixed.

It is more preferable that the offset vector at node on the edge of the boundary surface of the mesh is obtained by using two offset vectors obtained in each average direction of two faces adjacent to each edge.

It is still more preferable that the offset vector at node on the vertex of the boundary surface of the mesh is obtained by using three offset vectors obtained in each average direction of three faces adjacent to each vertex.

Also, the above objects can be accomplished by a method of constructing a hexahedral mesh used in finite element analysis is provided, the method comprising: a step of constructing a core mesh by superimposing a regular grid on a region to be meshed and removing external elements and external nodes of said region to be meshed; a step of amending said core mesh to have a boundary shape similar to that of said region to be meshed by repositioning nodes on the boundary of said core mesh; a step of constructing imaginary thin surface element layers on a boundary surface of said amended core mesh; and a step of performing a mesh smoothing on said imaginary thin surface element layers.

The step of constructing said imaginary thin surface element layers is performed by obtaining offset vectors outward at each node on face, edge and vertex of said boundary surface of said amended core mesh, positioning new nodes at positions offset in directions of said obtained offset vectors and then assigning connectivity of said new nodes for new elements.

Also, the step of performing a mesh smoothing is performed by repositioning node on vertex, nodes on edge and nodes on face of boundary surface of said imaginary thin surface element layers and internal nodes of said imaginary thin surface element layers, respectively.

BRIEF DESCRIPTION OF THE DRAWINGS

The embodiments of the present invention will be explained with reference to the accompanying drawings, in which.

DETAILED DESCRIPTION OF THE INVENTION

The above objects, other objects, features and advantages of the present invention will be better understood from the following description taken in conjunction with the attached drawings.

The finite element analysis is widely used for predicting safety of various structures, analyzing engineering problems associated with differential equation such as distribution analysis of electromagnetic field and the like and metal forming processes such as extrusion and forging.

Many commercial programs associated with the finite element analysis nowadays sell. In order to perform the finite element analysis, region to be analyzed must be divided into cells having a constant shape, that is, elements.

The present inventors developed processes of constructing surface element layers and mesh smoothing in order to improve the shape quality of a mesh in constructing a hexahedral mesh. If using the present invention, the shape quality of elements can be much improved to increase accuracy of analysis in constructing a hexahedral mesh or in reconstructing an old mesh.

In the present specification, vertexes of each cell of a hexahedral mesh are referred to as nodes and cells of the hexahedral mesh are referred to as element. A characteristic line is defined along sharp edges of mesh boundary line and the characteristic line has edges defined by two faces adjacent to each other and vertexes defined by three edges converged.

Now, an embodiment of the present invention will be described in detail with reference to the drawings.

Figure 1:
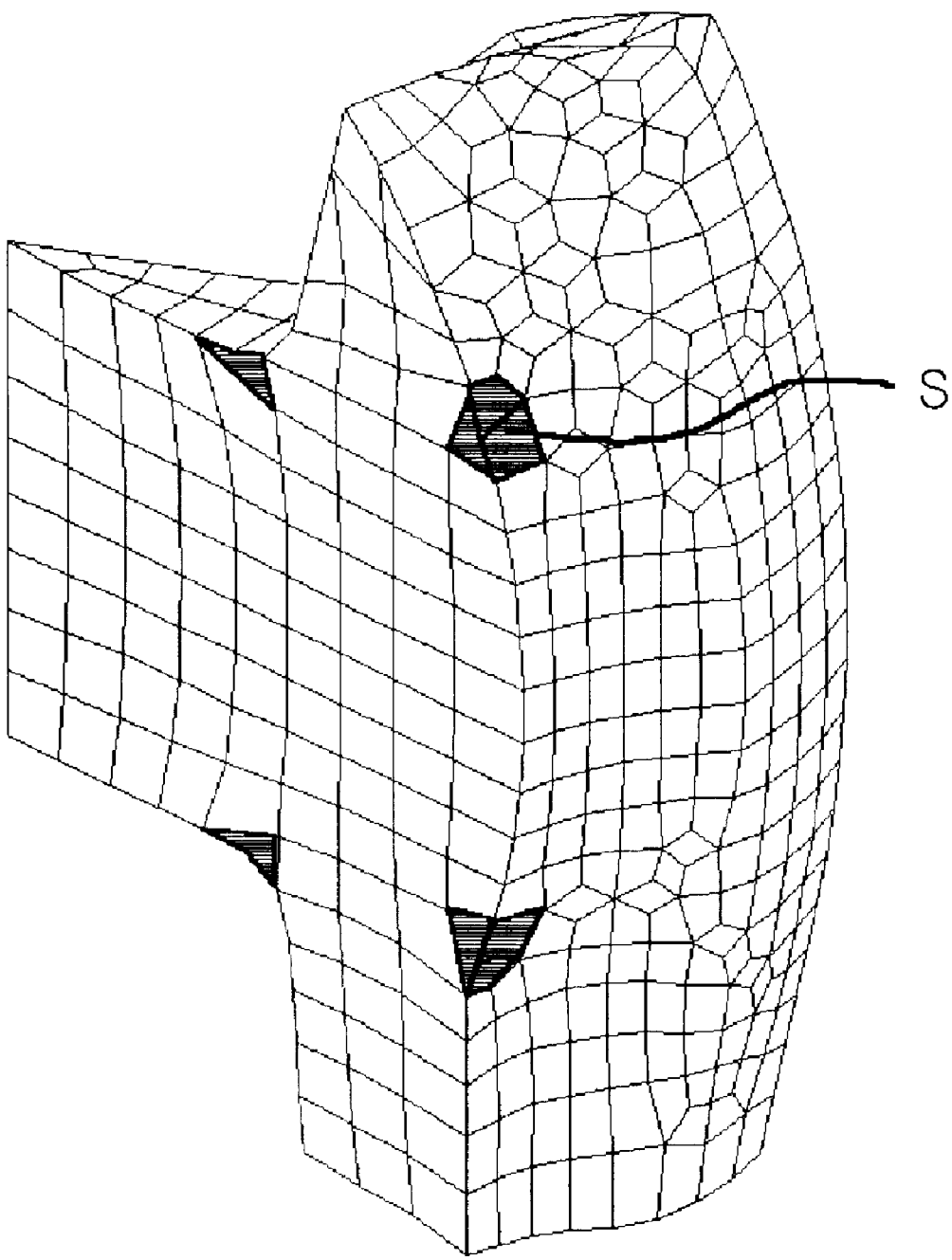
FIG. 1 is a perspective view of a hexahedral mesh used in finite. element analysis for illustrating a state that a part of surface elements of the mesh are severely distorted.
Figure 2:
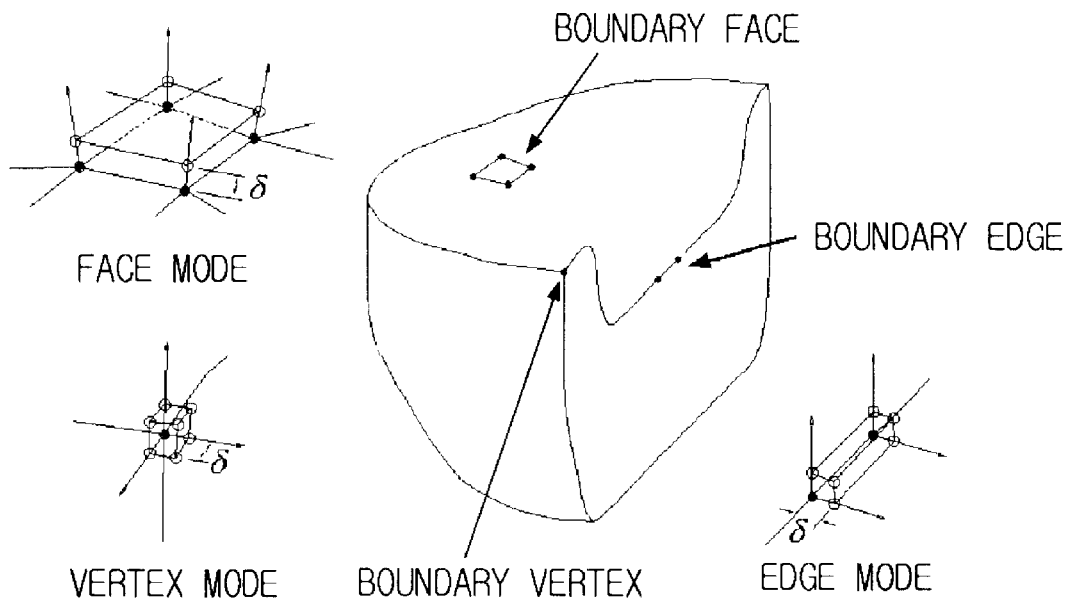
FIG. 2 is a drawing for illustrating a fundamental principle of a method of constructing surface element layers according to the present invention.
Figure 3:
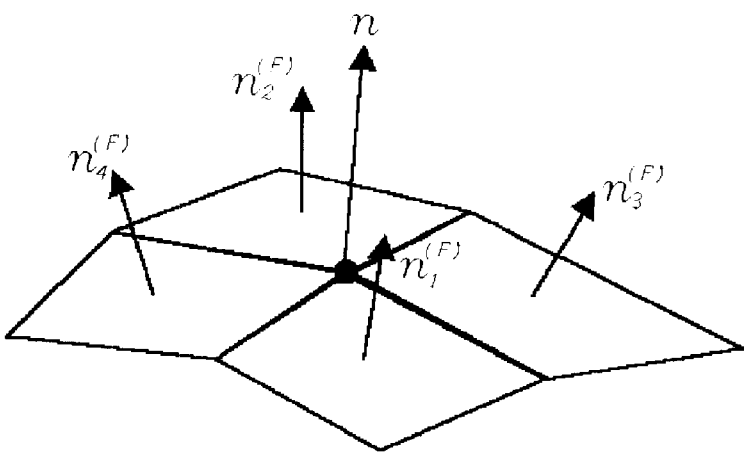
FIG. 3 is a drawing for illustrating a principle of repositioning face nodes of a boundary surface in a method of constructing surface element layers according to the present invention at face node.
Figure 4:
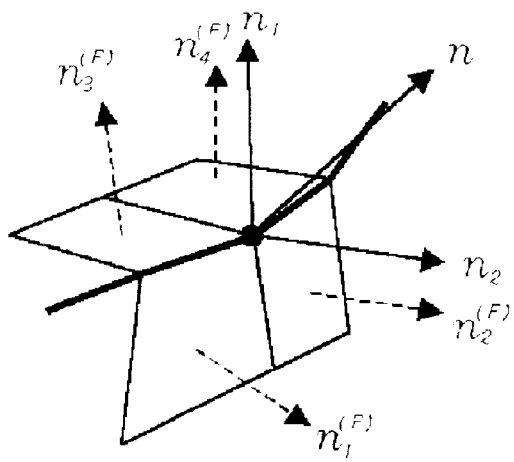
FIG. 4 is a drawing for illustrating a principle of repositioning edge nodes of a boundary surface in a method of constructing surface element layers according to the present invention.
Figure 5:
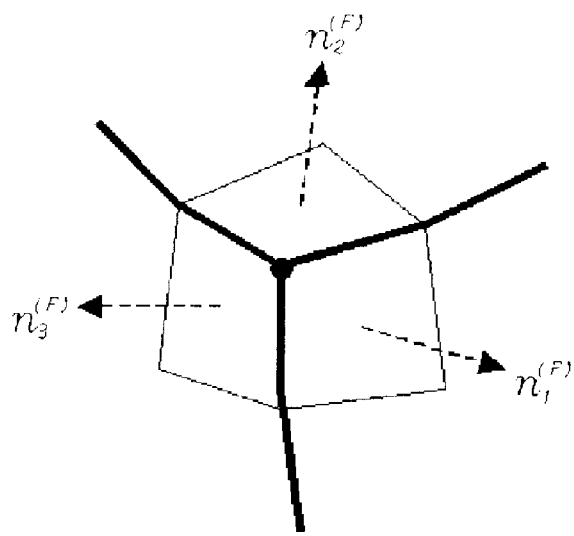
FIG. 5 is a drawing for illustrating a principle of repositioning vertex nodes of a boundary surface in a method of constructing surface element layer according to the present invention at vertex node.
Figure 6:
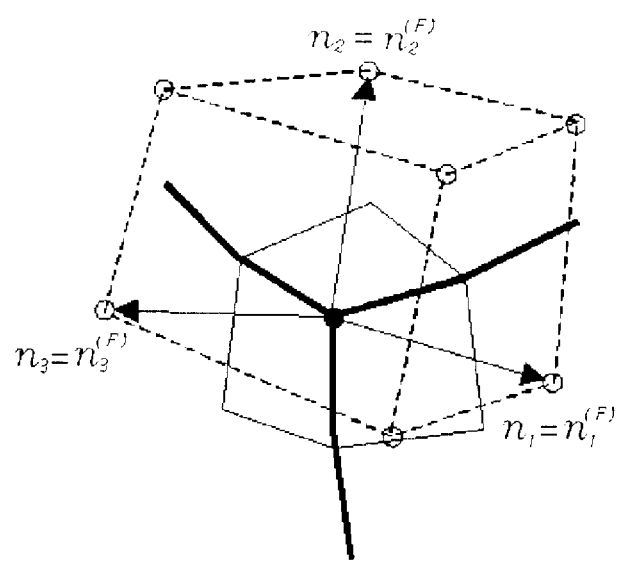
FIG. 6 is a drawing for illustrating an example of offset nodes and surface element layers constructed in FIGS. 3 through 5.
Figure 7:
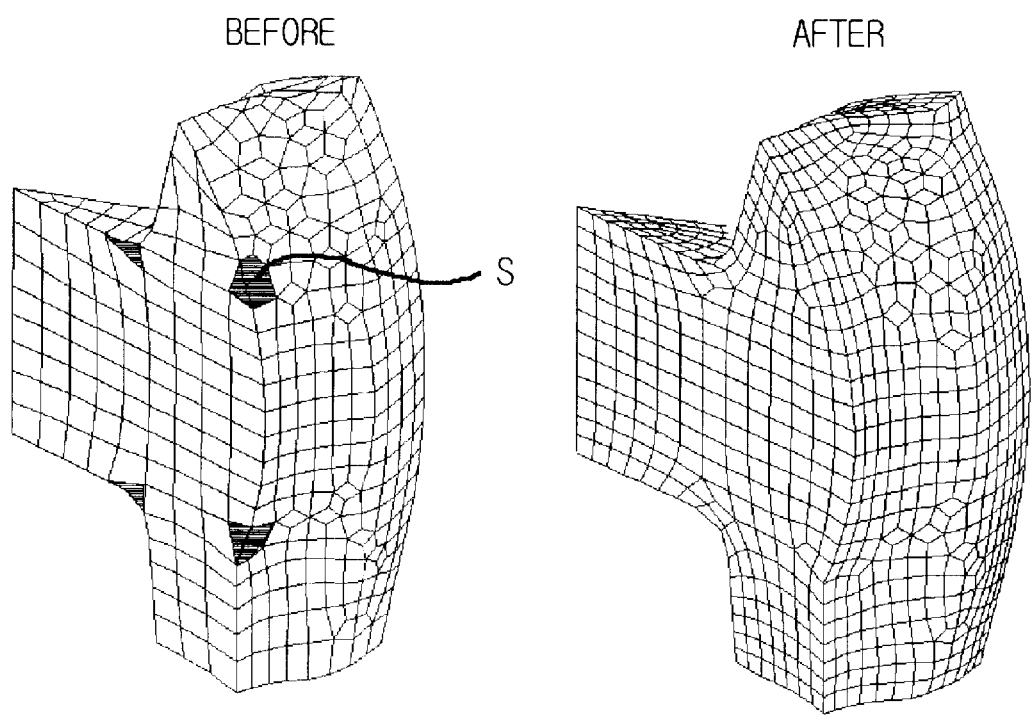
FIG. 7 is a drawing for comparing the mesh constructed by a method of constructing surface element layers according to the present invention with the mesh shown in FIG. 1.

FIG. 1 is a perspective view of a hexahedral mesh used in finite element analysis for illustrating a state that a part of surface elements of the mesh are severely distorted; FIG. 2 is a drawing for illustrating a fundamental principle of a method of constructing surface element layers according to the present invention; FIG. 3 is a drawing for illustrating a principle of repositioning face nodes of a boundary surface in a method of constructing surface element layers according to the present invention at face node; FIG. 4 is a drawing for illustrating a principle of repositioning edge nodes of a boundary surface in a method of constructing surface element layers according to the present invention; FIG. 5 is a drawing for illustrating a principle of repositioning vertex nodes of a boundary surface in a method of constructing surface element layer according to the present invention at vertex node; FIG. 6 is a drawing for illustrating an example of offset nodes and surface element layers constructed in FIGS. 3 through 5; and FIG. 7 is a drawing for comparing the mesh constructed by a method of constructing surface element layers according to the present invention with the mesh shown in FIG. 1.

According to the present invention, when ill-shaped elements S exist on the boundary of a hexahedral mesh used in finite element analysis as shown in FIG. 1, one or more imaginary thin surface element layers is constructed on the boundary and repositioning nodes on the imaginary thin surface element layers is performed, so that quality of the whole mesh elements can be improved.

Hexahedral mesh construction begins with forming a core mesh by superimposing a regular mesh to the region to be meshed and removing external elements and external nodes. The boundary shape of such core mesh is not equal to the real boundary shape of the region. Therefore, the boundary shape of the core mesh is required to be amended to be similar to the real boundary shape of the region. Such amendment is performed by obtaining normal vector outward at nodes on the boundary surface of the core mesh and projecting in directions of the normal vectors the nodes on the real boundary shape of the region.

Amendment of the boundary nodes of the core mesh is only to move the boundary nodes to the real boundary surface of the object. Therefore, severely distorted elements exist on the surface of the amended core mesh. In order to increase accuracy in finite element analysis, it is necessary to construct a mesh having well-shaped boundary elements.

For this purpose, the inventors of the present invention invented construction of surface element layers to cover severely distorted boundary elements of the amended core mesh with well-shaped elements.

In the present invention, very thin surface element layer having a thickness near 0 is constructed. Such surface element layer, as shown in FIG. 2, is constructed based on the boundary faces, the sharp boundary edges and the pointed boundary vertexes of the amended core mesh. The imaginary thin surface element layers can be constructed by repeating above process. After construction of the imaginary thin surface element layers, mesh smoothing is performed to improve quality of the whole mesh, by repositioning boundary nodes on the surface element layers and giving the surface element layers a thickness.

Now, the method of constructing the imaginary thin surface element layers will be described in detail.

As shown in FIGS. 2 through 5, offset vectors are obtained in outward direction at the boundary nodes of the amended core mesh. New nodes are constructed at positions offset in directions of the offset vectors. Then, connectivity of the new nodes for new elements is assigned to construct the imaginary thin surface element layer(s).

When a series of such processes is performed on the whole boundary face, the whole boundary edges and the whole boundary vertexes of the amended core mesh, as shown in FIG. 6, surface element layer of multi-layer structure can be constructed on the surface of the amended core mesh.

At that time, the offset vectors at nodes on the boundary edges and on the boundary vertexes is obtained by using information of the adjacent faces. That is, the offset vector at face node, as shown in FIG. 3, is obtained by averaging normal vectors of all faces $n_1^{(F)}, n_2^{(F)}, n_3^{(F)}, n_4^{(F)}$, the offset vector at edge node of the characteristic line, as shown in FIG. 4, is obtained by dividing faces adjacent to the edge into two sorts of faces with reference to the edge and obtaining two offset vectors $n_1, n_2$ in average directions of respective sorts of faces.

The offset vector at vertex node on the boundary is obtained, as shown in FIG. 5, by dividing faces adjacent to the vertex into three sorts of faces with reference to the characteristic line and obtaining three offset vectors in average directions of respective sorts of faces. Then, by constructing new nodes offset very thinly (1/100 to 1/1000 of average size of an element) using the obtained offset vectors and connecting the new nodes, new elements for the imaginary thin surface element layer is made.

However, as described above, the thickness of the imaginary thin surface element layer is too thin to be used in real analysis. Therefore, mesh smoothing is performed to use such mesh with the surface element layer in real analysis. The mesh smoothing is repositioning nodes of the surface element layer. At that time, repositioning nodes of the surface element layer is performed in order of repositioning nodes on the edges, repositioning nodes on the faces and repositioning the internal nodes, in a state that positions of nodes on the vertexes are fixed.

Nodes at sharp edge of the surface element layer are repositioned by rearranging the nodes along the characteristic line, appropriately (at the same intervals).

The face nodes are repositioned according to following Equation 1:

$$P_N = \frac{\sum_{i=1}^{N_F} A_i^F C_i^F}{\sum_{i=1}^{N_F} A_i^F} \quad \text{[Equation 1]}$$

where $P_N$ is a new coordinate of a node, $A_i^F$ is an area of an i-th face adjacent to the node and $C_i^F$ is a center coordinate of the i-th face. After repositioning the face nodes using Equation 1, the internal nodes are repositioned according to following Equation 2:

$$P_N = \frac{\sum_{i=1}^{N_E} V_i^E C_i^E}{\sum_{i=1}^{N_E} V_i^E} \quad \text{[Equation 2]}$$

where $P_N$ is a new coordinate of an internal node of said imaginary thin surface element layers, $V_i^E$ is an volume of an i-th element including the node and $C_i^E$ is a center coordinate of the i-th face.

Repositioning of nodes using Equations 1 and 2 is repeated several times to complete mesh smoothing.

Mesh newly constructed by such mesh smoothing has quality to be used in finite element analysis, the mesh having one or more layers of surface element almost vertically formed on the surface of the core mesh to improve quality of the surface elements.

FIG. 7 shows a hexahedral mesh finally completed by constructing the surface element layers on the mesh shown in FIG. 1 and performing mesh smoothing on the surface element layers. As shown in FIG. 7, it is known that quality of the surface elements is much improved.

According to the aforementioned present invention, the method of constructing surface element layers for improving shape of hexahedral mesh used in finite element analysis and the method of constructing hexahedral mesh using the method of constructing surface element layers can improve accuracy of prediction in analysis.

The method of constructing surface element layers of hexahedral mesh can be applied not only to the mesh constructed by the conventional grid-based approach, but also to hexahedral mesh constructed by any other mesh construction method.

Although technical spirits of the present invention have been disclosed with reference to the appended drawings and the preferred embodiments of the present invention corresponding to the drawings has been described, descriptions in the present specification are only for illustrative purpose, not for limiting the present invention.

Also, those who are skilled in the art will appreciate that various modifications, additions and substitutions are possible without departing from the scope and spirit of the present invention. Therefore, it should be understood that the present invention is limited only to the accompanying claims and the equivalents thereof, and includes the aforementioned modifications, additions and substitutions.

What is claimed is:

1. A method of constructing surface element layers of a hexahedral mesh used in finite element analysis, the method comprising:

constructing imaginary thin surface element layers on a boundary surface of a mesh; and performing a mesh smoothing on said imaginary thin surface element layers, wherein said step of constructing said imaginary thin surface element layers is performed by obtaining offset vectors outward at each node on faces, edges and vertexes of said boundary surface of said mesh, positioning new nodes at positions offset in directions of said obtained offset vectors and then assigning connectivity of said new nodes for new elements.

2. The method of constructing surface element layers of a hexahedral mesh according to claim 1, wherein said offset vectors at nodes on the edges of the boundary surface are obtained by using two offset vectors obtained in each average direction of two faces adjacent to the edge.

3. The method of constructing surface element layers of a hexahedral mesh according to claim 1, wherein said offset vectors at nodes on the vertexes of the boundary surface are obtained by using three offset vectors obtained in each average direction of three faces adjacent to the vertex.

4. A method of constructing surface element layers of a hexahedral mesh used in finite element analysis, the method comprising:

constructing imaginary thin surface element layers on a boundary surface of a mesh; and performing a mesh smoothing on said imaginary thin surface element layers, wherein said step of performing a mesh smoothing is performed by repositioning nodes on vertexes, nodes on edges, and nodes on faces of a boundary surface of said imaginary thin surface element layers, and internal nodes of said imaginary thin surface element layers.

5. The method of constructing surface element layers of a hexahedral mesh according to claim 4, wherein said repositioning of nodes is performed in order of repositioning nodes on the edges, repositioning nodes on the faces and repositioning the internal nodes, in a state that positions of nodes on the vertexes are fixed.

6. The method of constructing surface element layers of a hexahedral mesh according to claim 4, wherein said repositioning nodes on the faces is performed according to a following equation, $$P_N = \frac{\sum_{i=1}^{N_F} A_i^F C_i^F}{\sum_{i=1}^{N_F} A_i^F}$$

where $P_N$ is a new coordinate of a node, $A_i^F$ is an area of an i-th face adjacent to the node and $C_i^F$ is a center coordinate of the i-th face.

7. The method of constructing surface element layers of a hexahedral mesh according to claim 4, wherein said repositioning the internal nodes is performed according to a following equation, $$P_N = \frac{\sum_{i=1}^{N_E} V_i^E C_i^E}{\sum_{i=1}^{N_E} V_i^E}$$

where $P_N$ is a new coordinate of an internal node of said imaginary thin surface element layers, $V_i^E$ is an volume of an i-th element including the node and $C_i^E$ is a center coordinate of the i-th face.

8. A method of constructing a hexahedral mesh used in finite element analysis, the method comprising:

constructing a core mesh by superimposing a regular grid on a region to be meshed and removing external elements and external nodes of said region to be meshed;

amending said core mesh to have a boundary shape similar to that of said region to be meshed by repositioning nodes on the boundary of said core mesh;

constructing imaginary thin surface element layers on a boundary surface of said amended core mesh; and performing a mesh smoothing on said imaginary thin surface element layers, wherein said step of constructing said imaginary thin surface element layers is performed by obtaining offset vectors outward at each node on faces, edges and vertexes of said boundary surface of said amended core mesh, positioning new nodes at positions offset in directions of said obtained offset vectors and then assigning connectivity of said new nodes for new elements.

9. A method of constructing a hexahedral mesh used in finite element analysis, the method comprising:

constructing a core mesh by superimposing a regular grid on a region to be meshed and removing external elements and external nodes of said region to be meshed;

amending said core mesh to have a boundary shape similar to that of said region to be meshed by repositioning nodes on the boundary of said core mesh;

constructing imaginary thin surface element layers on a boundary surface of said amended core mesh; and performing a mesh smoothing on said imaginary thin surface element layers, wherein said step of performing a mesh smoothing is performed by repositioning nodes on vertexes, nodes on edges and nodes on faces of a boundary surface of said imaginary thin surface element layers and internal nodes of said imaginary thin surface element layers.

* * * * *